(12) United States Patent
Mo et al.

(10) Patent No.: US 7,245,635 B2
(45) Date of Patent: Jul. 17, 2007

(54) SYSTEM AND METHOD FOR RESIZING THE PHYSICAL LINK BANDWIDTH BASED ON UTILIZATION THEREOF

(75) Inventors: Li Mo, Plano, TX (US); James A. Spallin, Allen, TX (US); Jennifer J. Liu, Plano, TX (US); Abinder S. Dhillon, Allen, TX (US); James H. Buchanan, Ottawa (CA); Badarinath Devalla, Plano, TX (US)

(73) Assignee: Fujitsu Limited (JP)

( * ) Notice: Subject to any disclaimer, the term of this patent is extended or adjusted under 35 U.S.C. 154(b) by 1040 days.

(21) Appl. No.: 09/979,000

(22) Filed: Oct. 15, 2001

(65) Prior Publication Data
US 2003/0072264 A1 Apr. 17, 2003

Related U.S. Application Data

(60) Provisional application No. 60/295,146, filed on Jun. 1, 2001.

(51) Int. Cl.
*H04J 3/17* (2006.01)
*H04J 1/16* (2006.01)
*H04J 3/14* (2006.01)

(52) U.S. Cl. ............... 370/468; 370/252; 370/433

(58) Field of Classification Search ......... 370/433, 370/468, 230, 252, 443, 464; 710/117
See application file for complete search history.

(56) References Cited

U.S. PATENT DOCUMENTS 6,009,106 A * 12/1999 Rustad et al. ............ 370/523
6,163,527 A 12/2000 Ester et al.

(Continued)

OTHER PUBLICATIONS

World Wide Web, http://www.cis.ohlo-state.edu/~jain/cis788-97/virtual_lans/index.htm, Suba Varadarajan, "Virtual Local Area Networks", printed on Feb. 7, 2000, 12 pages.

(Continued)

*Primary Examiner*—Doris H. To
*Assistant Examiner*—Kerri M Rose
(74) *Attorney, Agent, or Firm*—Marc A. Hubbard; Gardere Wynne Sewell LLP

(57) ABSTRACT

A method for allocating and resizing a link on a communication medium is provided. The utilization of an allocated link is monitored and an unused bandwidth thereof is determined. Upon request for allocation of a second link, at least a portion of the unused bandwidth is included in the bandwidth of the second link allocated. A network including two nodes and a communication medium terminated thereby is operable to provide a plurality of communication links and is operable to resize the bandwidth of the allocated links is provided. The network is operable to monitor the utilization of an allocated bandwidth of an allocated link and deallocate a part of the allocated bandwidth that is non-utilized by the allocated link. The deallocated bandwidth, or a portion thereof, may then be included in a bandwidth allocation made for allocation of an additional link.

21 Claims, 3 Drawing Sheets

U.S. PATENT DOCUMENTS

| | | | |
|---|---|---|---|
| 6,373,860 B1 * | 4/2002 | O'Toole et al. | 370/493 |
| 6,469,982 B1 * | 10/2002 | Henrion et al. | 370/230 |
| 6,775,303 B1 * | 8/2004 | Rustad et al. | 370/523 |
| 6,876,668 B1 * | 4/2005 | Chawla et al. | 370/468 |
| 2005/0002392 A1 * | 1/2005 | Vijeh et al. | 370/389 |
| 2005/0243745 A1 * | 11/2005 | Stanwood et al. | 370/280 |
| 2005/0286559 A1 * | 12/2005 | Miernik et al. | 370/468 |

OTHER PUBLICATIONS

World Wide Web, http://www.ietf.org/internet-drafts/draft-ietf-mpls-arch-07.txt, Eric C. Rosen, "Multiprotocol Label Switching Architucture", printed on Jan. 9, 2001, 55 pages.

World Wide Web, http://www.ietf.org/internet-drafts/draft-ietf-mpls-generalized-rsvp-te-00Peter Ashwood-Smith, et al., "Generalized MPLS Signalling—RSVP-TE Extensions"printed on Jan. 9, 2001, 19 pages.

Yates, Jennifer, et al., "Reconfiguration in IP Over WDM Access Networks", AT&T Labs—Research, AT&T Shannon Laboratories, 4 pages.

Copyright 2000 by the Institute of Electrical and Electronics Engineers, Inc., "Local and Metropolitan Area Networks", IEEE Standard for Information technology, published Oct. 16, 2000, pp. 40-50.

* cited by examiner

SYSTEM AND METHOD FOR RESIZING THE PHYSICAL LINK BANDWIDTH BASED ON UTILIZATION THEREOF

This application claims priority to U.S. Provisional Application No. 60/295,146 filed Jun. 1, 2001 entitled, "System and Method Resizing the Physical Bandwidth Based on Utilization thereof."

TECHNICAL FIELD OF THE INVENTION

This invention relates to network technologies and, more particularly, to a system and method for resizing the bandwidth of a physical link based upon the utilization of the link.

BACKGROUND OF THE INVENTION

Real-time delivery of media over communication networks, such as the Internet, consistently strains network operators' ability to reliably and efficiently deliver data in a timely manner. The proliferation of data intensive services, such as streaming audio and video media, Internet content delivery, video conferencing and other services, often creates transmission capacity shortages on many types of networks. The proliferation of high bandwidth end-user equipment, such as digital subscriber line technologies and cable modems, demonstrates the consumer demand for broadband services continues to grow and further exacerbates shortage of network capacity related problems such as latency issues and delivery failures. Communication carriers continue to upgrade backbone and switching systems. However, the growth in media demand is often outpacing network operators ability to upgrade network transmission capacity.

Communication carriers often lease network lines, or portions of the capacity thereof, to corporate subscribers. Various services have been introduced to satisfy different customer needs. Best effort services are deployed for customer transmissions that may be categorized as low priority and not adversely effected by transmission delays. Best effort transmissions across a medium may be preempted by higher priority data and may be delayed until sufficient network capacity exists. High priority transmissions may have dedicated portions of a transmission medium, such as a fiber optic medium, statically allocated and dedicated to particular types of data transmissions such as video conferencing. The bandwidth allocated may be set-aside and unavailable for other data transmission types such as email or Internet content delivery. By dedicating a portion of a transmission medium capacity, the customer knows precisely how much data may be delivered at a given moment and allows the customer to plan and allocate data transmissions accordingly. However, services having a statically allocated bandwidth often result in network under-utilization. For example, a customer leasing a transmission medium and subscribing to a statically reserved service class may frequently not perform transmissions across the portion of the medium dedicated to a particular transmission class. At other times, transmissions across the statically reserved portion of the medium may only consume a fraction of the bandwidth that is reserved. The remaining portion of the reserved bandwidth is then idle and represents an under-utilization of the medium capacity. During the times when the reserved bandwidth is not utilized or is under-utilized, other lower-priority transmissions may be preemptively delayed or dropped although the totality of data being transmitted by the medium is less than the full capacity of the medium.

SUMMARY OF THE INVENTION

It may be seen from the foregoing that a system and method for providing resizing of the bandwidth of a physical link based upon the utilization of the link is desirable. In accordance with an embodiment of the present invention, a network operable to allocate a link on a communication medium and resize the bandwidth of the link based upon utilization thereof is provided. A communication link having a first bandwidth is allocated. Utilization of the link is monitored and the link is resized according to the utilization of the link.

In accordance with another embodiment of the present invention, a method of resizing a link in a communication medium is provided. A link having a first reserved bandwidth is allocated. The link is monitored and utilization of the link is determined. The link is resized according to the monitored utilization. A second link is then allocated and includes a portion of the first reserved bandwidth.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 5 of the drawings, like numerals being used for like and corresponding parts of the various drawings.

Figure 1:
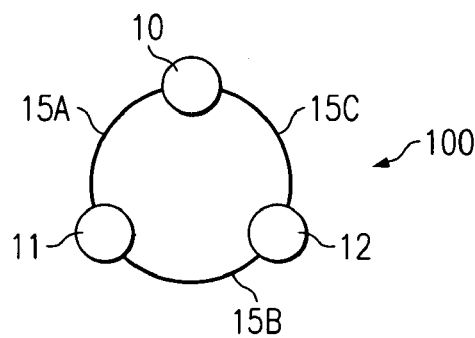
FIG. 1 is an exemplary network on which the present invention may be implemented.

In FIG. 1, there is illustrated an exemplary network 100 including nodes 10-12 interconnected by communication links 15A-15C. Network 100 may be implemented using any suitable transmission technology. In one embodiment, network 100 is a fiber optic network and, accordingly, nodes 10-12 may be implemented as optical transport network nodes although the particular transmission medium is irrelevant with regard to the scope of the invention. While the present invention contemplates an implementation on an optical network, the invention as described herein is not intended to be limited thereto and, accordingly, network 100 may be any type of network capable of making data transmissions across a communication medium terminated by two nodes, for example node 10 and 11. Thus, implementation of the present invention may be made in any number of network configurations, for example a ring network 100, a mesh network, etc. Furthermore, the communication medium need not be a 'land line,' as the present invention may find application on a radio frequency medium such as a wireless data network, a mobile communication network, etc.

Network 100 may employ a management node, such as management control system (MCS) node, that may be in communication with one or more nodes 10-12. Control of various network 100 functions may be facilitated through MCS 30. Link allocation and deallocation on mediums 15A-15C may be directed by MCS 30 as well as enforcement of network 100 policies. Link utilization monitoring is performed by the present invention by gathering link usage metrics and link resizing is directed by MCS 30 as is described more fully hereinbelow.

Figure 2:
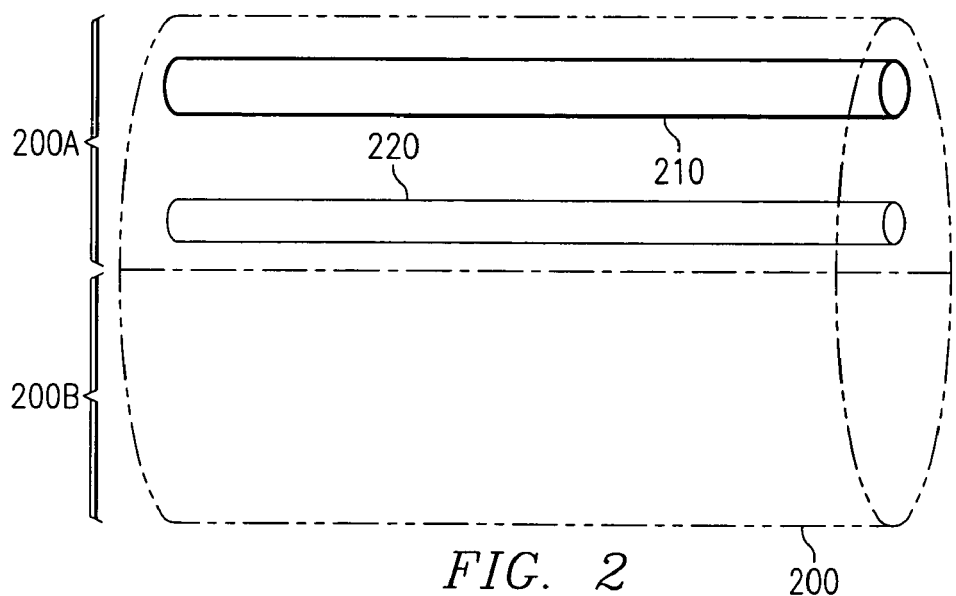
FIG. 2 is a communication medium that may support one or more channels between nodes terminating the medium.

In FIG. 2, there is illustrated a communication medium 200 that may support one or more channels between nodes terminating medium 200. Medium 200 has a maximum available bandwidth capacity that may be defined by the physical limitations of medium 200 and/or by the limitations of the nodes terminating medium 200. The bandwidth of medium 200 is partitionable into one or more channels, or links, each having a respective bandwidth that may be allocated for making data transmissions and/or time division multiplexed traffic on the channel(s) between the nodes terminating medium 200. A channel allocation may be made upon a request for a transmission or, alternatively, a reserved channel may be allocated on medium 200 and the reserved channel bandwidth of the allocated channel may be reserved on medium 200 for any future transmission requests. Channel allocations may be partitioned as well. While the invention described herein provides resizing of allocated channel bandwidth, the invention may be applied to resizing of channel partitions as well.

Various classes of services may be defined that prioritize transmissions across a particular channel. Service classes facilitate quality of service guarantees and enable a network operator to levy various fees for different priorities and network resources that are provided to a subscriber. For example, a reserved channel class may be defined and include a guaranteed bandwidth that is available on medium 200 at all times. Accordingly, bandwidth of a reserved channel includes a portion of medium 200 capacity that is unavailable to other classes of service and other channel allocations. In general, a reserved channel is a static allocation of a predefined bandwidth and may be used for transmission types that are latency-sensitive, for example audio-video streaming such as teleconferencing. Another exemplary class of service is a best effort channel class. In general, a best effort channel is allocated upon transmission request and is not guaranteed to be immediately available, that is allocation of a best effort channel class may be made any time after a transmission request and when medium 200 capacity is available. A best effort channel may be used for low priority transmissions that are not generally latency-sensitive, for example email transmissions.

Medium 200 includes a portion 200A having a reservation bandwidth that is reserved and thus unavailable for transmissions external to reserved channel 210. The remaining, unreserved portion 200B may be used for allocating other channels. As additional channels are allocated, the unreserved portion 200B is reduced by a corresponding amount. For example, reserved channel 210 has a reserved bandwidth (RBW) that, when allocated, is removed from availability for transmissions external to transmissions made over reserved channel 210. Thus, allocation of reserved channel 210 reduces the capacity of medium 200 available for other channel allocations by an amount equal to the RBW of channel 210.

A best effort channel 220 may be allocated upon a request identified as a best effort request. Allocation of best effort channel 220 may be limited to an upper bandwidth limit and may be preempted by other channel allocations. Best effort channel classes may include various sub-classes that allow preemption of other, lower-subclasses of best effort channels.

The present invention provides a modification to a reserved channel class, and channels allocated according to the teachings herein are referred to as a dynamic reserved channels, and has a resizable reserved bandwidth. The bandwidth of a dynamic reserved channel is resizable based upon the dynamic reserved channel utilization. Statically allocated reserved channels frequently result in under-utilization of medium 200 resources. Often, a reserved channel may have no transmissions made therethrough. At other times, a reserved channel may be carrying transmissions that only consume a fraction of the bandwidth reserved therefore. Lower priority requests are often denied, or alternatively granted at a lower bandwidth, although medium 200 is carrying data at a portion of the overall capacity thereof due to reserved channel allocations that are under-utilized. The dynamic reserved channel class improves capacity utilization of a medium by allowing portions of the bandwidth of a dynamic reserved channel 230 to be "borrowed" by reservation of additional channels based upon an observed utilization of the dynamic reserved channel thereby reducing the size of the bandwidth allocated from a medium's unreserved bandwidth.

Figure 3A:
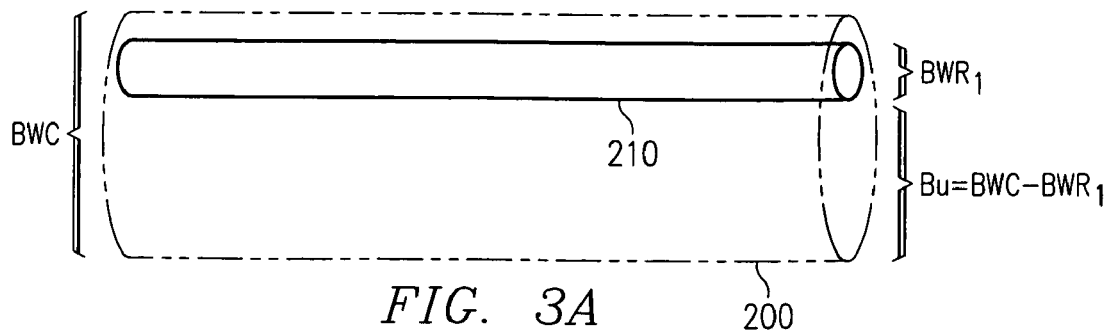
FIGS. 3A and 3B are a communication medium at different stages of channel allocation therein.

In FIG. 3A, there is illustrated communication medium 200 having reserved channel 210 allocated therein. Medium 200 has a maximum bandwidth capacity of BWC. Reserved channel 210 is statically allocated and has a reservation bandwidth of BWR1. Accordingly, the unreserved bandwidth (Bu) is equal to the bandwidth capacity (BWC) of medium 200 less the reserved bandwidth of channel 210. Bu thus represents the available capacity of medium 200 that may be used for allocating another reserved channel or lower priority best effort channel allocations.

Figure 3B:
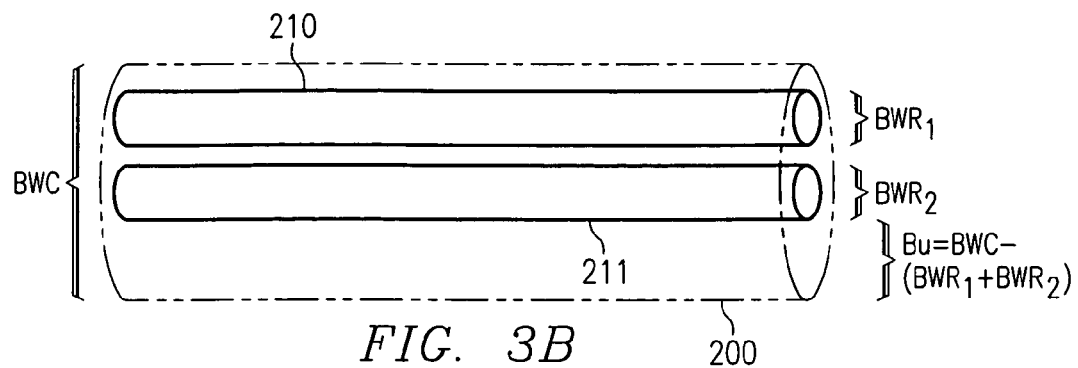

With reference to FIG. 3B, there is illustrated medium 200 after another reserved channel 211 having a reservation bandwidth of BWR2 has been allocated. Upon allocation of channel 211, the unreserved bandwidth of medium 200 is equal to the bandwidth capacity of medium 200 less the sum of reserved bandwidths of reserved channels 210 and 211, that is Bu=BWC−(BWR1+BWR2). Bu represents the available bandwidth capacity of medium 200 that may be allocated for additional reserved channels or other lower priority best effort channels. Allocation of reserved channels and/or best effort channels may continue until the bandwidth capacity of medium 200 is consumed by the totality of the bandwidth of all channel allocations.

Figure 4A:
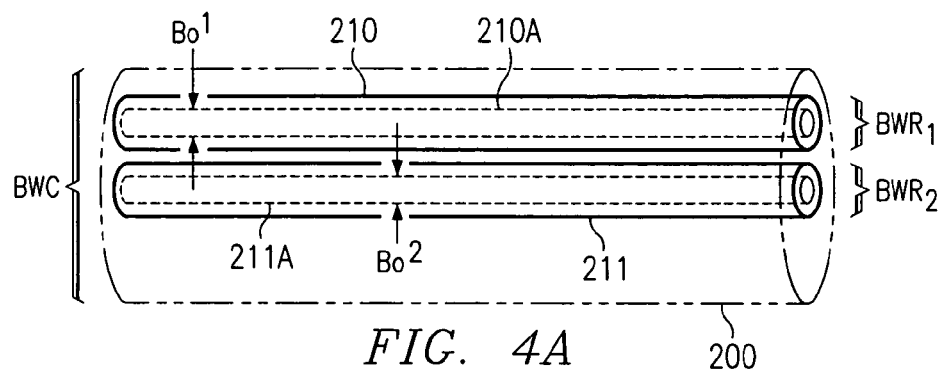
FIG. 4A is a communication medium with reserved channels and utilization thereof as allocated according to the prior art.

In FIG. 4A, there is illustrated medium 200 with reserved channels 210 and 211 each having a respective reserved bandwidth BWR1 and BWR2 allocated thereon and including a representation of an exemplary utilization of channels 210 and 211. Prior art techniques for channel allocations include static reservations and best effort channel allocations. When a channel is allocated that has a statically reserved bandwidth, that particular bandwidth is effectively removed from the available capacity of the medium regardless of the usage thereof. For example, allocation of channel 210 removes a bandwidth BWR1 from the available capacity of medium 200. This bandwidth is reserved and unusable by other channels regardless of the usage of channel 210. For example, the actual throughput of channel 210 may at any time range from zero up to the reserved bandwidth BWR1. In the present example, channel 210 has an actual observed usage bandwidth (Bo1) 210A that is less than the reserved bandwidth BWR1. Allocation of another channel 211 then reduces the available medium 200 capacity by an additional amount equivalent to its reserved bandwidth BWR2 regardless of the actual utilization, or observed bandwidth (Bo2), 211A thereof. A result of static allocations of reserved channels is often an under-utilization of medium 200 capacity. For example, the combined observed bandwidths (Bo1 and Bo2) of reserved channels 210 and 211 may be a fraction of the combined reserved bandwidths (BWR1 and BWR2) that is removed from the overall available unreserved bandwidth Bu of medium 200.

Figure 4B:
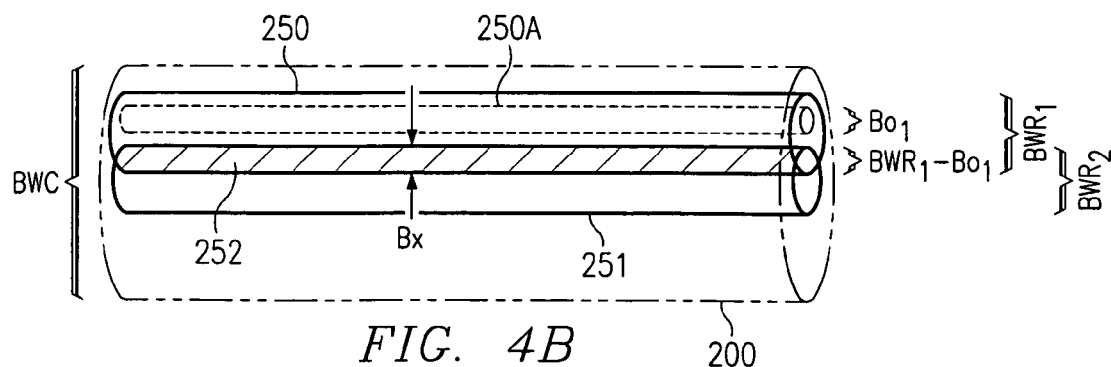
FIG. 4B is the communication medium of FIG. 4A with reserved channels and utilization thereof as allocated according to the teachings of the present invention.

The present invention defines a new class of service referred to as a dynamic reserved channel that may "borrow" allocated capacity from another dynamic reserved channel and "loan" reserved bandwidth to another dynamic reserved channel based upon the utilization of a reserved bandwidth of the dynamic reserved channel. In FIG. 4B, there is illustrated medium 200 having a dynamic reserved channel 250 allocated therein according to the teachings of the invention. Medium 200 has a total bandwidth capacity of BWC. Dynamic reserved channel 250 is allocated and has a reserved bandwidth of BWR1. An observed bandwidth (Bo1) is monitored and provides a measurement of the utilization of dynamic reserved channel 250. Upon request for an allocation of another dynamic reserved channel 251, an evaluation of any unused reserved bandwidth (referred to herein as Bx) of any other dynamic reserved channel is made. In the present example, dynamic reserved channel 250 has a bandwidth of (BWR1−Bo1) that is reserved but unused. This unused reserved bandwidth (Bx) may then be "loaned" to dynamic reserved channel 251 upon request for a bandwidth reservation for allocation of channel 251. In this case, dynamic reserved channel is said to "borrow" the Bx, or a portion thereof, of channel 250. This is figuratively illustrated by overlap 252 between dynamic reserved channels 250 and 251. If the requested bandwidth for dynamic reserved channel 251 exceeds the Bx of dynamic reserved channel 250, an additional reservation of bandwidth from medium 200 capacity may be made in the amount the requested allocation exceeds the available Bx. In the present example, dynamic reserved channel 251 has a reserved bandwidth of BWR2 and, thus, an amount BWR2−(BWR1−Bo1) is newly reserved from the available unreserved bandwidth capacity of medium 200 (referred to herein as Bu) that, in addition to the Bx of channel 250, fulfills the requested bandwidth BWR2 of channel 251 allocation. If, on the other hand, the requested bandwidth BWR2 for allocation of dynamic reserved channel 251 is less than the Bx of dynamic reserved channel 250, the entirety of channel 251 may be allocated within the Bx of dynamic reserved channel 250.

The present invention may better be understood with reference to FIGS. 5A-5E and TABLE A that summarizes various channel allocations made on a communication medium 300 according to the teachings of the invention. Medium 300 of the present example has a bandwidth capacity (BWC) of 2000 Mb/s. Accordingly, prior to allocating any channels on medium 300, an unreserved bandwidth of 2000 Mb/s exists on medium 300 (cell A2). Preferably, various tracking variables that facilitate resizing of links are maintained within the network that includes medium 300 and, accordingly, an unreserved bandwidth tracking variable Bu indicates 2000 Mb/s of unreserved bandwidth existing on medium 300. The various tracking variable may be maintained by a management node such as MCS 30. An allocation request for dynamic reserved channel 310 of 500 Mb/s is first requested (cell B1) and made (cell B4). The unreserved bandwidth (Bu) available on medium

TABLE A

| | | A<br>Init | B<br>C1 | C<br>Resize | D<br>C2 | E<br>C3 | F<br>Resize | G<br>C1 | |
|---|---|---|---|---|---|---|---|---|---|
| 1 | Reservation BW | | 500 | | 100 | 400 | | −500 | BW per reservation request |
| | CAC | | | | | | | | |
| | Global for link | | | | | | | | |
| 2 | Bu | 2000 | 1500 | 1500 | 1500 | 1300 | 1300 | 800 | BW Unreserved |
| | AF1 Specific | | | | | | | | |
| | Maintained across actions | | | | | | | | |
| 3 | Bx[AF1] | 0 | 0 | 300 | 200 | 0 | 200 | 0 | BW Reserved but unused |
| 4 | R[AF1] | 0 | 500 | 500 | 600 | 1000 | 1000 | 1200 | Reserved for the class |
| 5 | TB[AF1] | 0 | 0 | 0 | 100 | 300 | 300 | 0 | Total Borrowed |
| | Temporary variables or added for clarity | | | | | | | | |
| 6 | RBu[AF1] | 0 | 500 | 500 | 500 | 700 | 700 | 1200 | Amount of reservation from Bu |
| 7 | Change in Bu | 0 | −500 | | 0 | −200 | | 0 | |
| 8 | Reused | 0 | 0 | 0 | 100 | 200 | 0 | | Additional borrowed |
| 9 | Freed | | | | | | | 500 | Amount of TB freed |
| | Resizing | | | | | | | | |
| | AF1 Specific | | | | | | | | |
| 10 | R[AF1] | | | 500 | | | 1000 | | Total bandwidht reservation |
| 11 | RBu[AF1] | | | 500 | | | 700 | | |
| 12 | Percent Usage | 0 | | 40% | | | 50% | | |
| 13 | Bo[AF1] | 0 | | 200 | | | 500 | | Observed BW |
| 14 | Unused | | | 300 | | | 200 | | Unused BW, but reserved |

300 is reduced by an equivalent amount of the dynamic reserved channel bandwidth and reduces the unreserved bandwidth (Bu) to 1500 Mb/s (cell B2). Cell B6 indicates that the entirety of the allocation for the dynamic reserved channel was made from the unreserved bandwidth (Bu) and is further clarified by cell B7 that indicates the change in Bu, in this case by −500 Mb/s.

The allocated bandwidth of dynamic reserved channel 310 may be resized according to a monitored utilization of channel 310 as summarized by column C of TABLE A. In the present example, the dynamic reserved channel has an observed bandwidth (Bo) 310A of 200 Mb/s (cell C13), or a utilization of 40% (cell C12) and thus an unused reserved bandwidth (Bx) of 300 Mb/s (cells C3 and C14) across medium 300 exists. The monitored utilization may be obtained by various usage metrics periodically obtained by an MCS in communication with one or more of the nodes terminating medium 300.

Figure 5A:
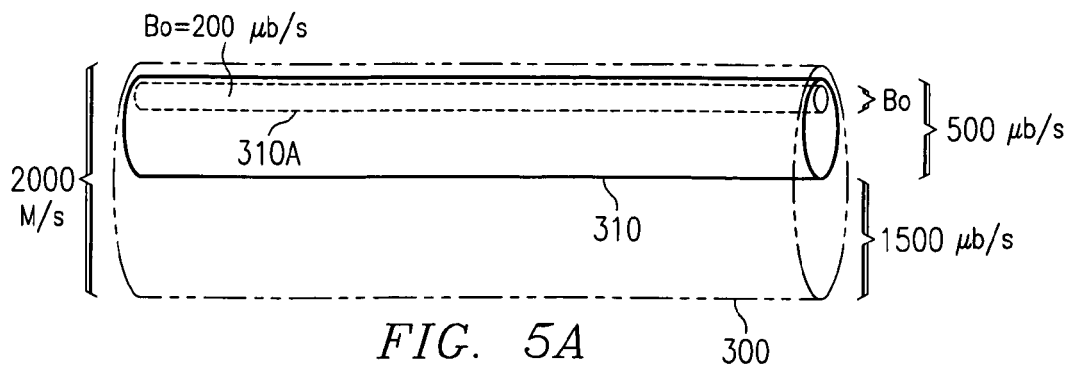
FIGS. 5A-5E is a communication medium in various scenarios of channel allocation and deallocation thereon according to the teachings of the present invention.
Figure 5B:
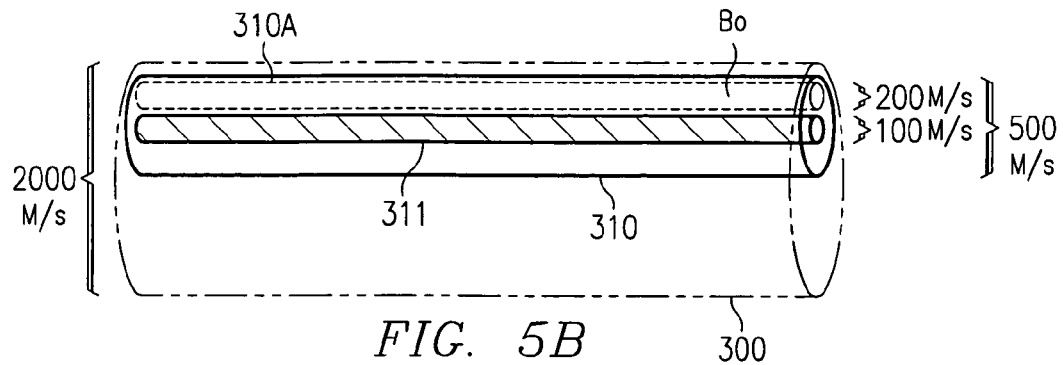

With reference to FIG. 5B, a request for allocation of another dynamic reserved channel 311 having a reserved bandwidth of 100 Mb/s is made (cell D1). An evaluation of the unused reserved bandwidth is made and indicates an unused reserved bandwidth of 200 Mb/s (cell D3) exists in medium 300. Thus, the entirety of the requested 100 Mb/s of bandwidth of the second channel may be borrowed (cell D5) from the unused reserved bandwidth Bx (as illustratively denoted by cross-hatches). An accumulation of the requested reserved bandwidth is calculated (cell D4) and includes the 500 Mb/s of bandwidth requested for channel 310 and the 100 Mb/s of bandwidth requested for channel 311. The accumulation of the requested bandwidth is 600 Mb/s although, due to the bandwidth borrowing mechanism of the invention, only 500 Mb/s of bandwidth has been allocated from medium 300 unreserved capacity (cell D6). An accumulation of the borrowed bandwidth is made and is indicated by cell D8 to be 100 Mb/s. Thus, a bandwidth request for allocation of a channel may be fulfilled by bandwidth that has previously been reserved but that has been determined to be unused. A tracking variable is preferably employed that monitors the accumulated amount of bandwidth that has been determined to be reserved but unused and subsequently included in allocation of an additional channel/s. This tracking variable is designated TB in TABLE A.

Figure 5C:
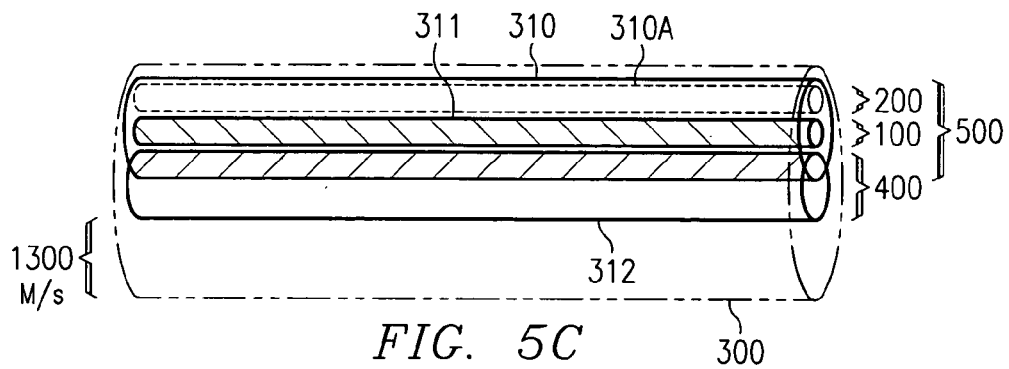

With reference to FIG. 5C, an allocation request for another dynamic reserved channel 312 having a bandwidth of 400 Mb/s is made (cell E1). An analysis of the unused reserved bandwidth Bx indicates that, prior to allocation of channel 312, 200 Mb/s of unused reserved bandwidth remains (cell D3). Accordingly, allocation of the channel 312 includes borrowing the remaining 200 Mb/s (as illustratively denoted by cross-hatches and an increment of 200 Mb/s of tracking variable TB) of unused reserved bandwidth from channel 310 resulting in zero unused reserved bandwidth (cell E3). The remaining 200 Mb/s required to fulfill the bandwidth request for allocation of channel 312 is allocated from the unreserved bandwidth of medium 300 resulting in a 200 Mb/s decrement from the unreserved bandwidth (Bu) (cell E7) and results in 1300 Mb/s of bandwidth remaining that is unreserved (cell E2). The reserved channel bandwidth tracking variable (R) is incremented by 400 Mb/s upon allocation of channel 312 and results in a total bandwidth of 1000 Mb/s cumulatively reserved for the channel class although only 700 Mb/s of medium 300 capacity has been physically allocated (cell E6).

Figure 5D:
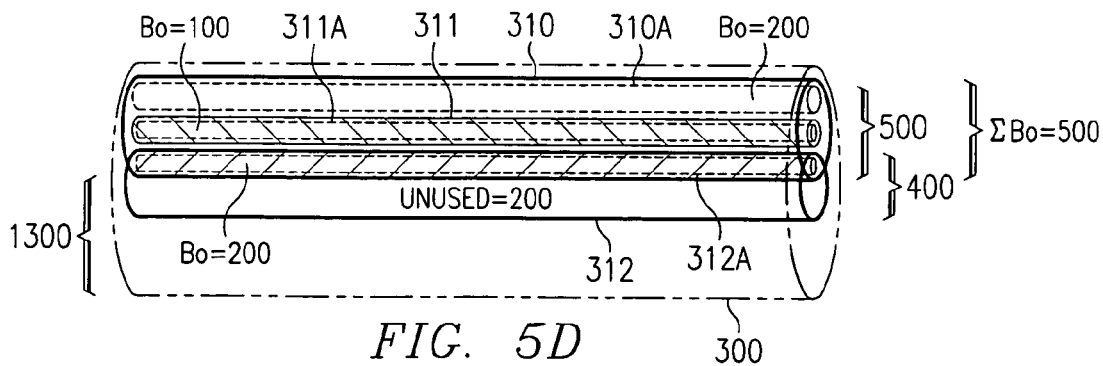

Continuing with the present example, channel resizing is again performed and includes analyzing channel utilization of allocated channels 310-312. In the present example, an observed bandwidth indicates that 500 Mb/s of bandwidth is being utilized (cell F13), that is a 50% utilization of the 1000 Mb/s of reserved bandwidth (cell F12) of all allocated channels as illustrated in FIG. 5D. A total of 700 Mb/s of allocated bandwidth has thus far been made on medium 300 (cell F11). Of the 700 Mb/s of allocated bandwidth, an observed bandwidth Bo of 500 Mb/s indicates that 200 Mb/s of bandwidth has been physically allocated but is not being utilized (cells F3 and F14). Accordingly, after calculation of the utilization of channels 310-312 as summarized in column F of TABLE A, 200 Mb/s of bandwidth is available for borrowing by additional channel allocations (column F3).

Figure 5E:
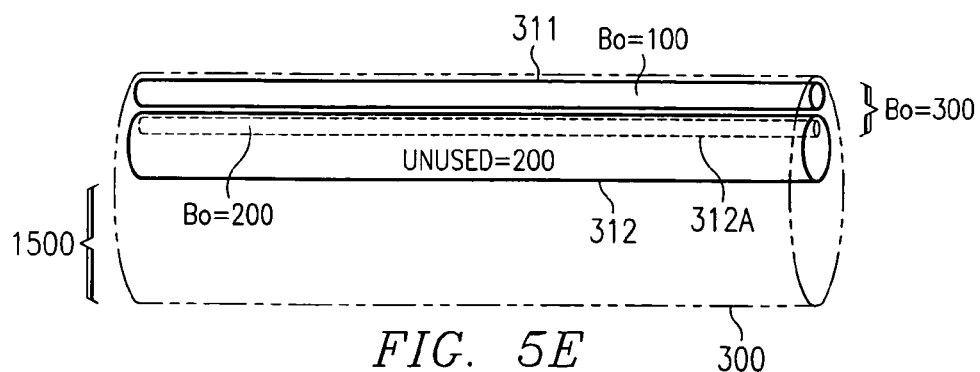

With reference to FIG. 5E, a request for deallocation of channel 310 is next made that deletes channel 310 from medium 300 and includes a corresponding decrease of 500 Mb/s of reserved bandwidth on medium 300 (cell G1). The resulting unreserved bandwidth of medium 300 is 1500 Mb/s (cell G2). The total reserved bandwidth for the remaining allocated channels 311 and 312 is 500 Mb/s (cell G4) which is fully allocated from medium 300 capacity, that is none of the reserved bandwidth is borrowed after deallocation of channel 310 (cell G5). Notably, the bandwidth that has been borrowed is recovered by the remaining allocated links before any bandwidth of a channel being deallocated is returned to the unused capacity of medium 300. Additionally, it is preferable that the allocation of channels is limited to bandwidth reservations not to exceed the bandwidth capacity of the medium 300 regardless of the amount of bandwidth that is available for borrowing. By limiting the reserved bandwidths of allocated channels to the bandwidth capacity of medium 300, one or more links having an increase in the utilization thereof that have previously been determined to be underutilized and subsequently resized by loaning bandwidth thereof to another channel may be resized by re-appropriating loaned bandwidth from a link borrowing bandwidth to a link that has loaned bandwidth. A tracking variable may be used to maintain a record of the total bandwidth requests (R) of channels as they are allocated. This tracking variable records only the initial bandwidth request made when allocating a particular channel and does not increase or decrease as bandwidth is borrowed or loaned to other channels. Accordingly, the value of the total bandwidth requested tracking variable preferably does not exceed the bandwidth capacity of medium 300.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A method for allocating a link on a communication medium that supports allocation of a plurality of links therein, comprising:
  monitoring the utilization of a first allocated link having a first reserved bandwidth allocated therefor on the medium;
  determining an unused bandwidth that is reserved by the first allocated link;
  requesting allocation of a new, second link having a second bandwidth on the medium;
  decrementing bandwidth allocated to the first allocated link by an amount less than or equal to the unused bandwidth, without eliminating all bandwidth allocated to the first allocated link; and allocating the new, second link having the second bandwidth without de-allocating the first allocated link, the second bandwidth allocated for the second link including at least a portion of the bandwidth decremented from the first reserved bandwidth.

2. The method according to claim 1, wherein requesting allocation of the second link further comprises requesting allocation of the second link having the second bandwidth greater than the unused bandwidth, a portion of the second bandwidth allocated for the second link including a portion of a bandwidth capacity of the medium that is unreserved prior to allocation of the second link.

3. The method according to claim 1, further comprising:
monitoring the utilization of the allocated first link and the second link having the first reserved bandwidth and the second reserved bandwidth;
determining a cumulative unused bandwidth that is reserved by the first allocated link and the second allocated link;
decrementing the allocated bandwidth of at least one of the first allocated link and the second allocated link by an amount less than or equal to the cumulative unused bandwidth; and
allocating one or more links having a respective reserved bandwidth allocated on the medium, the bandwidth allocated for the one or more links including at least a portion of the bandwidth decremented from at least one of the first allocated link and the second allocated link.

4. The method according to claim 1, further comprising:
monitoring the utilization of a plurality of links allocated on the medium, each of the plurality of links having a reserved bandwidth associated therewith and allocated on the medium;
determining a cumulative unused bandwidth that is reserved by the plurality of allocated links;
requesting allocation of an additional link having a bandwidth associated therewith;
decrementing the allocated bandwidth of at least one of the plurality of links by an amount less than the cumulative unused bandwidth; and
allocating the additional link, the bandwidth of the additional link allocated including at least a portion of the bandwidth decremented from at least one of the plurality of links.

5. The method according to claim 4, further comprising:
accumulating a measurement of the cumulative unused bandwidth prior to allocation of the additional link; and
decrementing the measurement by an amount equal to the portion of the decremented bandwidth that is used for allocation of the additional link.

6. The method according to claim 1, further comprising accumulating a measurement of the decremented bandwidth that is used for allocation of the second link.

7. The method according to claim 6, further comprising accumulating a measurement of the unused bandwidth.

8. The method according to claim 1, further comprising accumulating a count of link bandwidth reservations for the plurality of links allocated on the medium; and
denying a request for allocation of an additional link having an additional bandwidth that, in summation with the bandwidth reservations of the plurality of links, exceeds a total bandwidth capacity of the medium.

9. The method according to claim 5, further comprising:
deallocating one of the plurality of links allocated on the medium, the deallocated link having a bandwidth reservation associated therewith; and
freeing an amount of bandwidth equal to the minimum of the accumulated measurement of the decremented bandwidth and the bandwidth reservation of the deallocated link.

10. A network, comprising:
at least two nodes; and
a communication medium terminated by the two nodes and operable to provide a plurality of communication links therebetween, at least one allocated link on the medium having a respective allocated bandwidth reserved therefor, the network operable to monitor the utilization of the at least one allocated bandwidth of the at least one allocated link and deallocate a part, but not all, of the bandwidth allocated therefor, the deallocated part of the bandwidth determined to be non-utilized by the at least one allocated link, at least a portion of the deallocated part of the bandwidth included in a bandwidth allocated for at least one additional link allocated after the deallocation.

11. The network according to claim 10, wherein the deallocated part has an equivalent bandwidth of the portion included in the at least one additional link.

12. The network according to claim 10, further comprising a management control system in communication with at least one of the two nodes, the management control system operable to monitor the utilization of the allocated bandwidth and operable to deallocate the part of the bandwidth from the at least one allocated link, the management control system allocating the portion of the deallocated part of the bandwidth to allocation of the at least one additional link.

13. The network according to claim 12, wherein the utilization is measured by the management control system by measuring at least one metric related to the at least one allocated link.

14. The network according to claim 13, wherein the management control system maintains a record of the portion of the deallocated part included in the bandwidth allocated for the at least one additional link.

15. The network according to claim 12, wherein the management control system maintains a record of a cumulative total of bandwidth allocated for the at least one allocated link and the at least one additional link.

16. The network according to claim 10, wherein the summation of the bandwidth reserved for the at least one allocated link and the bandwidth reserved for the at least one additional link is less than or equal to a bandwidth capacity of the medium.

17. The network according to 10, wherein the bandwidth reserved for the at least one additional link is greater than the bandwidth determined to be non-utilized by the at least one allocated link, an amount of bandwidth equivalent to the difference between the bandwidth reserved for the at least one additional link and the bandwidth determined to be non-utilized by the at least one allocated link being allocated from an unused bandwidth capacity of the medium for allocation of the at least one additional link.

18. The network according to claim 10, wherein the network deallocates one of the allocated links having a bandwidth reserved therefor, an amount of bandwidth reserved for the deallocated link being returned to one or more of a remaining allocated links, the amount of bandwidth returned equivalent to a minimum of the portion of the deallocated part of the bandwidth included in a bandwidth allocated for at least one additional link allocated after the deallocation and the bandwidth reserved for the deallocated link.

19. The network according to claim 18, wherein the medium has a maximum bandwidth capacity, an unreserved bandwidth of the medium equivalent to the maximum bandwidth capacity less the bandwidth allocated for the at least one allocated link and the bandwidth allocated for the at least one additional link less the portion of the deallocated part, the unreserved bandwidth increasing by an amount equivalent to the bandwidth reserved for the deallocated link less the bandwidth returned to the one or more remaining links.

20. A management control system node for allocating bandwidth for links on a communication medium that supports allocation of a plurality of links therein, comprising:
   means for monitoring the utilization of a first allocated link having a first reserved bandwidth allocated therefor on the medium;
   means for determining an unused bandwidth that is reserved by the first allocated link;
   means for requesting allocation of a new, second link having a second bandwidth on the medium;
   means for decrementing bandwidth allocated to the first allocated link by an amount less than or equal to the unused bandwidth, without eliminating all bandwidth allocated to the first allocated link; and
   means for allocating the new, second link having the second bandwidth without de-allocating the first allocated link, the second bandwidth allocated for the second link including at least a portion of the bandwidth decremented from the first reserved bandwidth.

21. The management node according to claim 20, further comprising:
   means for monitoring the utilization of a plurality of links allocated on the medium, each of the plurality of links having a reserved bandwidth associated therewith and allocated on the medium;
   means for determining a cumulative unused bandwidth that is reserved by the plurality of allocated links;
   means for requesting allocation of an additional link having a bandwidth associated therewith;
   means for decrementing the allocated bandwidth of at least one of the plurality of links by an amount less than the cumulative unused bandwidth; and
   allocating the additional link, the bandwidth of the additional link allocated including at least a portion of the bandwidth decremented from at least one of the plurality of links.

* * * * *